July 7, 1925.

C. A. BARNES

BEDSPRING TIGHTENER

Filed March 29, 1922

1,544,548

Inventor
Clarence A. Barnes,
By
Attorney

Patented July 7, 1925.

1,544,548

UNITED STATES PATENT OFFICE.

CLARENCE A. BARNES, OF GENEVA, OHIO.

BEDSPRING TIGHTENER.

Application filed March 29, 1922. Serial No. 547,874.

*To all whom it may concern:*

Be it known that CLARENCE A. BARNES, a citizen of the United States of America, residing at Geneva, in the county of Ashtabula and State of Ohio, has invented new and useful Improvements in Bedspring Tighteners, of which the following is a specification.

The object of the invention is to provide a simple and efficient means for tensioning bed springs and similar objects arranged within a suitable supporting frame and particularly to provide a device for this purpose which may be manually adjusted and secured in its adjusted positions against accidental displacement; and with this object in view the invention consists in a construction and combination of parts of which a preferred embodiment is shown in the accompanying drawings, wherein:—

Figure 1:
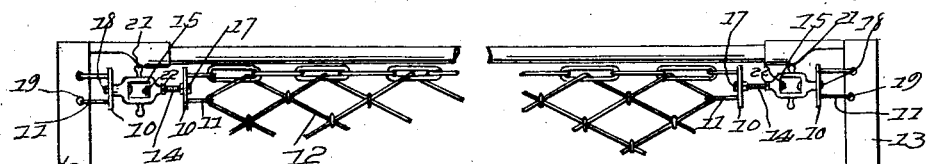
Figure 1 is a plan view showing a plurality of tighteners embodying the invention applied in the operative position to a bed spring.
Figure 2:
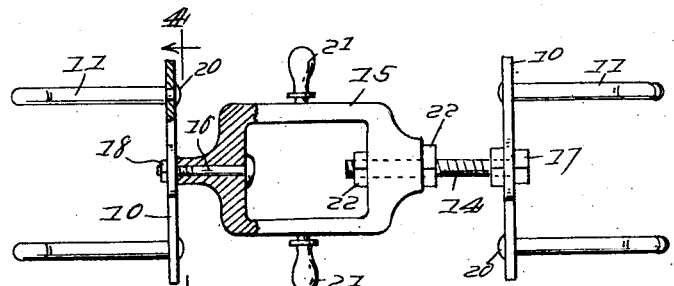
Figure 2 is a detail plan view partly in section of the tightener detached.
Figure 3:
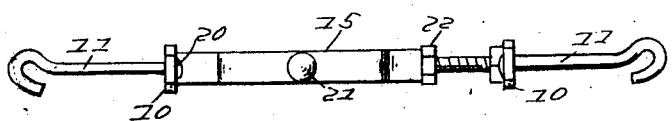
Figure 3 is an edge view of the tightener.
Figure 4:
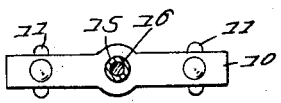
Figure 4 is a transverse section thereof on the plane indicated by the line 4—4 of Figure 2.

The device consists essentially of spaced heads 10 consisting of plates or bars or the equivalent carrying anchoring means such as hooks 11 adapted to be engaged with elements respectively of the bed spring or its equivalent as shown at 12 and the frame or its equivalent as shown at 13, and a take-up device located between and connecting said heads and consisting of a screw or bolt 14 and a turn buckle 15 threaded at one end upon said screw or bolt and swiveled at the other end by means of a spindle 16, said screw or bolt and spindle being respectively engaged at their outer or remote ends with the heads 10 as by means of nuts 17 and 18. Obviously the hooks 11 may be of a size and construction adapting them respectively for engagement with the objects with which they are intended to be used but in connection with metallic bed steads or springs and bed bottoms of the conventional forms the hooks may be of the type indicated in the drawing which is suitable for engagement with perforations 19 formed in the frame bars 13 of the bed stead and with the loops or meshes of the bed bottom or spring. The hooks may be swiveled as shown at 20 in the plates forming the heads 10 to permit of their adjustment to suit varying angles of the objects with which they are engaged.

The turn buckle 15 is preferably provided with radial grips 21 to facilitate the turning thereof to apply the required tension to the spring and mounted upon the screw or bolt 14 are jamb nuts 22 for locking the turn buckle in its adjusted position with relation to the bolt or screw after the required tension has been applied to the spring. It will be obvious that to effect a change in the adjustment or tension of the spring it is simply necessary to loosen the jamb nuts and turn the buckle one way or the other upon its swivel mounting.

Having described the invention, what is claimed as new and useful is:—

A spring tightener comprising a turn buckle provided at its opposite ends with heads, a bolt journaled in one of the heads, a plate fixed with said bolt and having end portions disposed beyond the sides of the said buckle, hooks carried by the said end portions of the plate, the intermediate portion of the plate bearing against the end surface of the adjacent head whereby the said plate is held at a right angle to the longitudinal dimension of the turn buckle, a screw bolt mounted for longitudinal movement through the other head of the turn buckle and aligned with the first mentioned bolt, nuts screwed upon the screw bolt and adjusted to engage the opposite surfaces of the adjacent head, a plate carried at the outer end of the screw bolt, hooks carried by the last mentioned plate and means for fixing the last mentioned plate with relation to the screw bolt whereby both of the said plates are at all times held parallel with relation to each other.

In testimony whereof he affixes his signature.

CLARENCE A. BARNES.